US005746468A

United States Patent [19]

Schoen et al.

[11] Patent Number: 5,746,468

[45] Date of Patent: May 5, 1998

[54] TORSION BAR ASSIST WITH RATCHET HOLD MECHANISM FOR AUTOMOBILE DECK LIDS

[75] Inventors: Robert M. Schoen, West Bloomfield; Anthony J. Anderson, Farmington, both of Mich.

[73] Assignee: Chrysler Corporation, Auburn Hills, Mich.

[21] Appl. No.: 549,412

[22] Filed: Oct. 27, 1995

[51] Int. Cl.$^6$ .................................................. B62D 25/10

[52] U.S. Cl. ............................ 296/76; 267/154; 16/298

[58] Field of Search .................... 296/76, 100; 267/154; 16/298, 180; 49/169

[56] References Cited

U.S. PATENT DOCUMENTS

| | | | |
|---|---|---|---|
| Re. 32,878 | 2/1989 | Leonard | 16/298 |
| 1,430,029 | 9/1922 | Rhodes . | |
| 1,859,563 | 5/1932 | Joekel . | |
| 2,894,277 | 7/1959 | Bogater et al. | 267/154 |
| 3,047,180 | 7/1962 | Fiala | 217/60 |
| 3,067,453 | 12/1962 | Lyons | 16/180 |
| 3,339,969 | 9/1967 | Bridle et al. | 296/76 |
| 3,476,375 | 11/1969 | Brasseur | 267/57 |
| 3,695,678 | 10/1972 | Gergoe | 296/76 |
| 3,765,717 | 10/1973 | Garvert | 296/137 B |
| 4,768,824 | 9/1988 | Andonian | 296/100 |
| 5,365,639 | 11/1994 | Lewkoski | 296/76 |

*Primary Examiner*—Gary C. Hoge

[57] ABSTRACT

A mechanism for assisting the movement of a deck lid of a vehicle includes a transverse torsion bar centrally formed with a bight segment. A roller is rollably engaged with the bight segment, and the ends of the torsion bar are affixed to the body of the vehicle. A ratchet track is affixed to the deck lid, with the ratchet track including a plurality of longitudinally spaced detents for releasably receiving the roller therein as the deck lid is moved. The torsion bar assists a person in raising the deck lid, with the cooperation between the ratchet track and torsion bar tending to hold the deck lid in positions that are intermediate the fully open and fully closed positions when the person releases the deck lid.

20 Claims, 1 Drawing Sheet

FIG. 1.
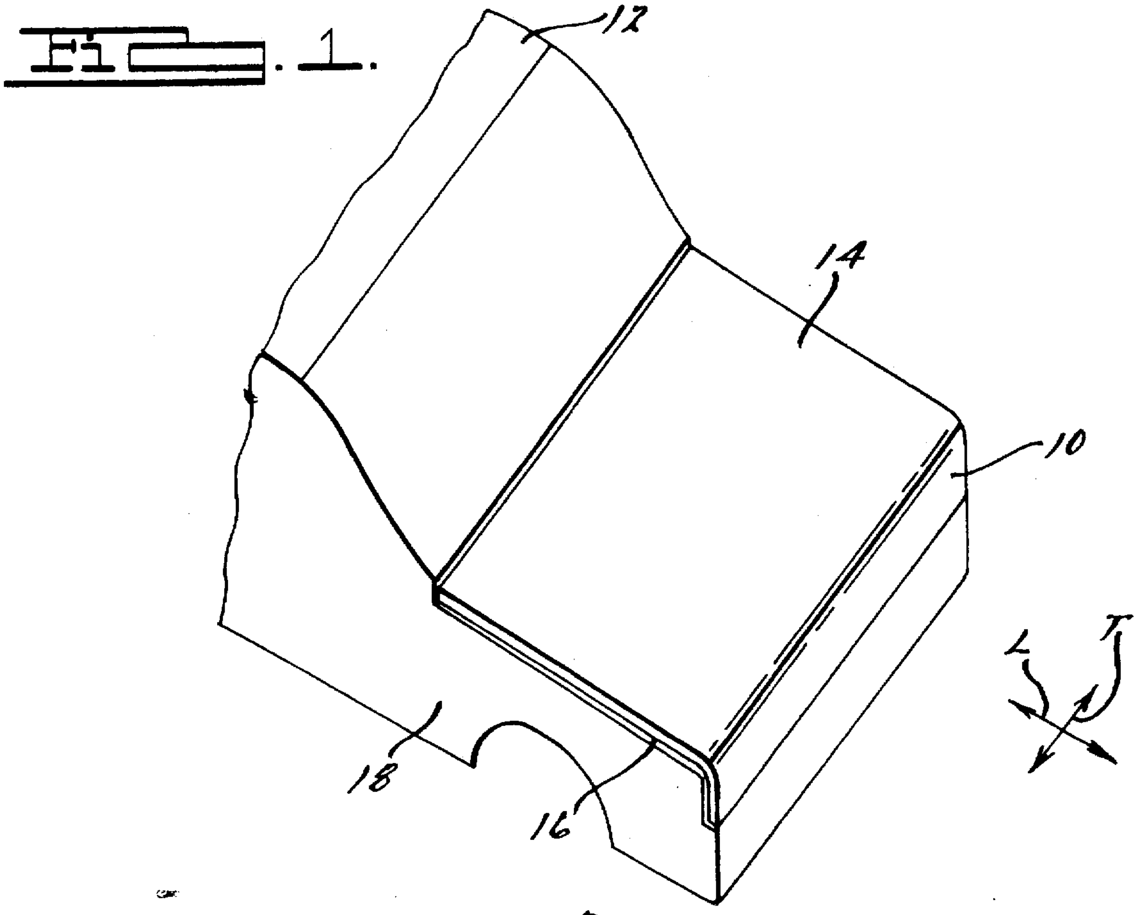
FIG. 2.
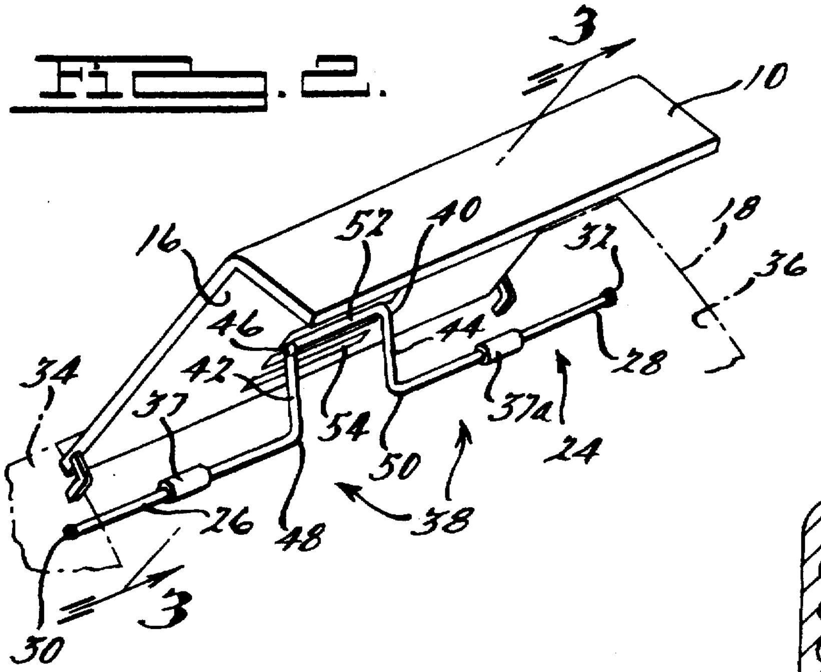
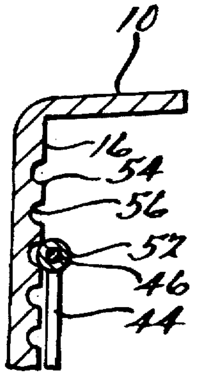
FIG. 3.

TORSION BAR ASSIST WITH RATCHET HOLD MECHANISM FOR AUTOMOBILE DECK LIDS

FIELD OF THE INVENTION

The present invention relates generally to automobiles, and more particularly to mechanisms for lifting the rear deck lid of an automobile.

BACKGROUND OF THE INVENTION

Torsion bars have been provided for assisting in raising rear trunk covers, referred to herein as "deck lids", to expose the trunk space of the vehicles with which the deck lids are associated. Typically, a torsion bar is oriented transversely in the trunk of the vehicle with which it is associated, with an end of the torsion bar being affixed to the body of the vehicle and with the torsion bar being configured so as to cause it to urge upwardly against the deck lid hinge and thus the deck lid.

While effective in urging deck lids upwardly, existing torsion bar lift assist systems do not facilitate maintaining a deck lid at intermediate positions between the fully closed and fully open positions when, for instance, the person lifting the deck lid releases the lid inadvertently, or when the person deliberately releases the lid to improve his or her purchase on the lid. This is unfortunate, particularly in the case of persons who are disabled or who otherwise might experience difficulty in raising the deck lid to its fully raised position. As recognized herein, however, it is possible to provide a lift assist system which addresses this problem.

Accordingly, it is an object of the present invention to provide a deck lid lift assist system which temporarily holds a deck lid of a vehicle in a position between its fully open and fully closed positions when a person releases the deck lid. Another object of the present invention is to provide a deck lid lift assist system which urges a deck lid of a vehicle toward an open position. Yet another object of the present invention is to provide a deck lid lift assist system that is easy to use and cost-effective to manufacture.

SUMMARY OF THE INVENTION

A system is disclosed for assisting the lifting and holding open of a "deck" (i.e., trunk) lid of an automobile. The system includes a torsion bar which is connected at one or both ends to a car body and which is radially supported by two bushings. The torsion bar includes an offset shaft around which a roller is rotatably engaged. The material bias of the torsion bar urges the roller into rolling engagement with a ratchet track, such that the torsion bar with roller tends to urge the lid open. The opening torque assist generated by the torsion bar is greater when the lid is nearer a closed position and less when the lid is nearer an open position. As disclosed further below, the ratchet track is formed with a plurality of ratchet detents configured for holding the roller stationary therein, unless and until the deck lid is gently urged toward open or closed positions.

Thus, the present invention is a mechanism which is engageable with a deck lid of a vehicle having a body for assisting movement of the deck lid relative to the body. The mechanism includes a torsion bar that defines first and second opposed ends, at least one of which is connected to the body. The torsion bar is oriented generally transversely relative to the vehicle. In accordance with the present invention, the torsion bar includes a bight segment having an offset shaft oriented transversely relative to the vehicle. The offset shaft is linearly offset from the ends of the torsion bar.

Furthermore, a roller is coupled to the offset shaft, and is preferably rollably coupled to the shaft. As envisioned herein, a ratchet track is affixed to or formed on the deck lid in contact with the roller. Per the present, the ratchet track includes a plurality of longitudinally spaced detents for releasably engaging the roller.

In a presently preferred embodiment, the torsion bar includes a left elongated bar element having an outboard end. The outboard end of the left bar element defines the first end of the torsion bar. Moreover, the left bar element has an inboard end that is contiguous to the bight segment. Likewise, a right elongated bar element has an outboard end defining the second end of the torsion bar and an inboard end which is contiguous to the bight segment.

The preferred bight segment advantageously includes a left bight element which is oriented generally longitudinally when the deck lid is in the closed position. The left bight element interconnects the inboard end of the left bar element and the offset shaft. Additionally, the preferred bight segment includes a right bight element that is oriented generally longitudinally when the deck lid is in the closed position, with the right bight element interconnecting the inboard end of the right bar element and the offset shaft.

In another aspect of the present invention, in a vehicle deck lid hingedly engaged with a body of the vehicle, a deck lid lift assist system includes a torsion member connected to the body and materially biased for urging the deck lid upwardly. Also, the deck lid assist system of the present invention includes a ratchet member associated with the deck lid for ratchetably engaging the torsion member.

In yet another aspect of the present invention, the combination of a vehicle and the above-described deck lid lift assist system is disclosed.

In still another aspect of the present invention, a method for movably coupling a deck lid to a body of a vehicle such that the deck lid is movable between an open position and a closed position includes associating a ratchet track with the deck lid. Additionally, the method includes affixing a torsion bar to the body, and then engaging the torsion bar with the ratchet track to urge the deck lid toward the open position.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a perspective view of a deck lid in a closed position on a vehicle, with portions of the vehicle broken away;

FIG. 2 is a perspective view of the deck lid in an open position in operative combination with the deck lid assist system of the present invention, with portions of the vehicle broken away and other portions shown in phantom; and FIG. 3 is a cross-sectional view of the deck lid assist system intermediate the open and closed positions, as would be seen along the line 3—3 in FIG. 2.

DETAILED DESCRIPTION OF THE PREFERRED EMBODIMENT

Referring initially to FIG. 1, a deck lid 10 is shown in a closed position to cover a trunk space of a vehicle 12. In the closed position shown, the deck lid 10 defines an outer horizontal top surface 14 and an inner horizontal bottom surface 16, only the edge of which bottom surface 16 can be seen in FIG. 1. Per the present invention, the vehicle 12 defines a longitudinal dimension, indicated by the double arrow "L", and a transverse dimension, indicated by the double arrow "T". As used below, terms of direction are referenced to the longitudinal dimension "L" and the transverse dimension "T" defined by the vehicle 12.

It is to be understood that the deck lid 10 is hingedly engaged with the body 18 of the vehicle 12 by means well-known in the art for movement between the closed position shown in FIG. 1 and an open position shown in FIG. 2. More particularly, referring to FIG. 2, left and right automotive trunk hinges 20, 22 are fixedly attached to the deck lid 10 and pivotably connected to the body 18 in accordance with well-known principles, to thereby hingedly engage the deck lid 10 with the body 18. As disclosed in detail below, it is the purpose of the present invention to assist a person in raising the deck lid 10 from the closed position shown in FIG. 1 to the open position shown in FIG. 2.

With particular reference to FIG. 2, an elongated, solid metal, cylindrically-shaped torsion bar, generally designated 24, includes left and right torsion elements 26, 28 which are generally transversely oriented. As shown, each torsion element 26, 28 includes a respective outboard end 30, 32. At least one, and in the preferred embodiment shown both, of the outboard ends 30, 32 are affixed to a respective side 34, 36 of the body 18 within a trunk space 38. The outboard ends 30, 32 of the torsion elements 26, 28 are affixed to the body 18 by means well-known in the art, e.g., by bolting or clamping the ends 30, 32 to the body 18, or by keying the ends 30, 32 to respective keyways (not shown) that are formed in the body 18.

Furthermore, the torsion elements 26, 28 are radially supported by at least two support bushings 37, 37*a*. As intended herein, the bushings 36, 38 are suitable automotive bushings that are connected to the body 18 and engaged with the torsion elements 26, 28 as appropriate to support the elements 26, 28.

FIG. 2 shows that the torsion bar 24 includes a generally U-shaped bight segment 40 that is centrally positioned on the torsion bar 24. In other words, the bight segment 40 is formed between the outboard ends 30, 32 of the torsion elements 26, 28. Preferably, the bight segment 40 is formed integrally with the torsion elements 26, 28.

In the preferred embodiment shown, the bight segment 40 includes an elongated solid metal left bight element 42. It is to be understood in reference to FIG. 2 that the left bight element 42 is oriented generally longitudinally when the deck lid 10 is in the closed position. Stated differently, the left bight element 42 is perpendicular to the torsion elements 26, 28.

Additionally, the bight segment 40 includes an elongated solid metal right bight element 44. As shown, the right bight element 44 is substantially parallel to the left bight element 42. Consequently, the right bight element 44 is oriented generally longitudinally in the vehicle 12.

Furthermore, the bight segment 40 includes an elongated solid metal offset shaft 46 which is oriented transversely in the vehicle 12. As shown, the left bight element 42 interconnects an inboard end 48 of the left torsion element 26 and the offset shaft 46. Similarly, the right bight element 44 interconnects an inboard end 50 of the right torsion element 28 and the offset shaft 46. Indeed, the left bight element 42 is contiguous to the inboard end 48 of the left torsion element 26. Likewise, the right bight element 44 is contiguous to the inboard end 50 of the right torsion element 28. Owing to the above-described combination of structure, the offset shaft 46 is positioned parallel to and rearwardly of the torsion elements 26, 28 relative to the vehicle 12.

Still referring to FIG. 2, a cylindrical hollow roller 52 is surroundingly engaged, and is preferably rollably engaged, with the offset shaft 46. In one presently preferred embodiment, the roller 52 is made of a rigid, wear-resistant material, such as hard plastic. As intended herein, the roller 52, bight segment 40, and torsion bar 24 establish a torsion member.

A generally rectangular-shaped metal or hard plastic ratchet track 54 is affixed to the inner surface 16 of the deck lid 10 in contact with the roller 52. Preferably, the ratchet track 54 is welded, bolted, or otherwise fixedly attached to the deck lid 10, with the long dimension of the ratchet track 54 oriented generally parallel to the longitudinal dimension of the vehicle 12 when the deck lid 10 is in the closed position. Alternatively, the ratchet track 54 can be formed integrally with the deck lid 10.

As best shown in FIG. 3, the ratchet track 54 includes a plurality of longitudinally spaced detents 56. More specifically, the ratchet track 54 is formed with transversely oriented half-cylindrical cavities that are formed on the ratchet track 54 in a longitudinal row. In accordance with the present invention, the cavities have slightly larger diameters than the roller 52 to establish the detents 56, and each detent 56 can releasably closely receive the roller 52 therein. Thus, the ratchet detents 56 are configured for holding the roller 52 stationary therein, unless and until the deck lid 10 is gently urged toward open or closed positions. As intended by the present invention, the ratchet track 54 and detents 56 establish a ratchet member.

It is to be understood that the detents 56 are longitudinally spaced from each other, inasmuch as when the deck lid 10 is in the closed position, the detents 56 are arranged in longitudinal serial order. It is to be further understood that in light of the above disclosure, the torsion bar 24 urges the roller 52 into contact with the ratchet track 54 and, hence, the torsion bar 24 urges the deck lid 10 toward the open position.

As intended by the present invention, the torsion bar 24 is affixed to the body 18 with torque pre-loaded into the torsion bar 24, such that the maximum torque pre-loading is present when the deck lid 10 is in the closed position. Furthermore, owing to the movement of the roller 52 over the ratchet track 54, the moment arm exerted by the torsion bar 24 against the deck lid 10 decreases as the deck lid 10 moves from the closed position toward the open position.

Consequently, when it is desired to move the deck lid 10 toward the open position, the torque assist to such movement imparted by the torsion bar 24 is greater when the person's mechanical advantage in opening the deck lid 10 is at a minimum (i.e., when the deck lid 10 is near the closed position). On the other hand, the torque assist to such movement imparted by the torsion bar 24 is less when the person's mechanical advantage in opening the deck lid 10 is at a maximum (i.e., when the deck lid 10 is near the open position).

Accordingly, the operation of the deck lid assist system can now be appreciated. The deck lid 10 can be raised from the closed position shown in FIG. 1 to the open position shown in FIG. 2 by a person. As the deck lid 10 is being raised, the torsion bar 24, owing to the torque pre-loading, urges the roller against the ratchet track 54 and, thus, urges the deck lid 10 toward the open position. As the deck lid 10 moves, the roller 52 rolls over the ratchet track 54. This cooperation between the roller 52 and ratchet track 54 causes the roller 52 to sequentially engage the detents 56, so that if the person releases the deck lid 10 in a position intermediate the fully open and fully closed positions, the deck lid 10 remains in the intermediate position with the roller 52 held in one of the detents 56.

Further manipulation of the deck lid 10 by the person causes the detent 56 to release the roller 52 to permit further movement of the deck lid 10. When it is desired to move the deck lid to the closed position, the person urges downwardly on the lid 10, and the roller 52 rolls over the ratchet track 54. Should the person release the lid 10, the roller 52 will engage one of the detents 56 to hold the deck lid 10 substantially in the position it is in when released by the person.

In light of previous disclosure, the skilled artisan will appreciate when it is desired to move the deck lid 10 back toward the closed position, the counter-torque to such movement imparted by the torsion bar 24 is less when the person's mechanical advantage in closing the deck lid 10 is at a minimum (i.e., when the deck lid 10 is near the open position). On the other hand, the counter-torque to such movement imparted by the torsion bar 24 is greater when the person's mechanical advantage in closing the deck lid 10 is at a maximum (i.e., when the deck lid 10 is near the closed position). In any case, the torque of the torsion system alone, without additional torque supplied by a person, is insufficient to cause the roller 56 to move out of the detent 56.

As used herein, the ratchet track 54 is so called because movement of the roller 52 relative to the track 54 stops by virtue of the cooperation between the roller 52 and the detents 56. It is to be understood in light of the above disclosure, however, that two-way travel of the roller 52 against the ratchet track 54 is permitted, provided a person appropriately imparts sufficient force to the deck lid 10.

While the particular TORSION BAR ASSIST WITH RATCHET HOLD MECHANISM FOR AUTOMOBILE DECK LIDS as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A mechanism engageable with a deck lid of a vehicle having a body for assisting movement of the deck lid relative to the body, comprising:

a torsion bar defining first and second opposed ends establishing a line therebetween, at least one end being connected to the body with the torsion bar oriented generally transversely relative to the vehicle, the torsion bar including a bight segment having an offset shaft oriented transversely relative to the vehicle and offset from the line established by the ends of the torsion bar;

a roller coupled to the offset shaft; and a ratchet track positioned on the deck lid in contact with the roller, the ratchet track including a plurality of longitudinally spaced detents, each detent for releasably engaging the roller.

2. The mechanism of claim 1, wherein the deck lid is hingedly engaged with the body for movement between an open position and a closed position, and the torsion bar urges against the ratchet track to urge the deck lid toward the open position.

3. The mechanism of claim 2, wherein the roller is rollably engaged with offset shaft and ratchet track.

4. The mechanism of claim 2, wherein when the deck lid is in the closed position, the deck lid defines an outer generally horizontal surface and an inside generally horizontal surface, and the ratchet track is affixed to or formed integrally with the inside horizontal surface of the deck lid.

5. The mechanism of claim 4, further comprising a plurality of radial support bushings operatively engaged with the torsion bar.

6. The mechanism of claim 4, wherein the torsion bar includes:

a left elongated bar element having an outboard end defining the first end of the torsion bar and an inboard end contiguous to the bight segment; and a right elongated bar element having an outboard end defining the second end of the torsion bar and an inboard end contiguous to the bight segment.

7. The mechanism of claim 6, wherein the bight segment includes:

a left bight element oriented generally longitudinally when the deck lid is in the closed position, the left bight element interconnecting the inboard end of the left bar element and the offset shaft; and a right bight element oriented generally longitudinally when the deck lid is in the closed position, the right bight element interconnecting the inboard end of the right bar element and the offset shaft.

8. In a vehicle deck lid hingedly engaged with a body of the vehicle, a deck lid lift assist system, comprising:

a torsion member connected to the body and materially biased for urging the deck lid upwardly; and a ratchet member associated with the deck lid for ratchetably engaging the torsion member, the ratchet member including a ratchet track positioned on the deck lid in contact with the torsion member, the ratchet track including a plurality of longitudinally spaced detents, each detent for releasably engaging the torsion member.

9. The system of claim 8, wherein the torsion member includes:

a torsion bar defining first and second opposed ends, at least one end being connected to the body with the torsion bar oriented generally transversely relative to the vehicle, the torsion bar including a bight segment having an offset shaft oriented transversely relative to the vehicle and positioned rearwardly of the ends of the torsion bar relative to the vehicle; and a roller coupled to the offset shaft.

10. The system of claim 9, wherein the torsion bar further includes:

a left elongated bar element having an outboard end defining the first end of the torsion bar and an inboard end contiguous to the bight segment; and a right elongated bar element having an outboard end defining the second end of the torsion bar and an inboard end contiguous to the bight segment.

11. The system of claim 10, wherein the bight segment includes:

a left bight element oriented generally longitudinally, the left bight element interconnecting the inboard end of the left bar element and the offset shaft; and a right bight element oriented generally longitudinally, the right bight element interconnecting the inboard end of the right bar element and the offset shaft.

12. The system of claim 11, wherein the ratchet member includes:

a ratchet track positioned on the deck lid in contact with the roller, the ratchet track including a plurality of longitudinally spaced detents, each detent for releasably engaging the roller.

13. The system of claim 12, further comprising a plurality of radial support bushings operatively engaged with the torsion bar.

14. A vehicle, comprising:

a body;

a deck lid hingedly attached to the body;

a torsion bar defining first and second opposed ends, at least one end being connected to the body with the torsion bar oriented generally transversely relative to the vehicle, the torsion bar including a bight segment having an offset shaft oriented transversely relative to the vehicle and positioned rearwardly of the ends of the torsion bar relative to the vehicle;

a roller coupled to the offset shaft; and a ratchet track associated with the deck lid in contact with the roller, the ratchet track including a plurality of longitudinally spaced detents, each detent for releasably engaging the roller.

15. The vehicle of claim 14, wherein the deck lid is hingedly engaged with the body for movement between an open position and a closed position, and the torsion bar urges against the ratchet track to urge the deck lid toward the open position.

16. The vehicle of claim 15, wherein when the deck lid is in the closed position, the deck lid defines an outer generally horizontal surface and an inside generally horizontal surface, and the ratchet track is affixed to the inside horizontal surface of the deck lid.

17. The vehicle of claim 16, wherein the torsion bar includes:

a left elongated bar element having an outboard end defining the first end of the torsion bar and an inboard end contiguous to the bight segment; and a right elongated bar element having an outboard end defining the second end of the torsion bar and an inboard end contiguous to the bight segment.

18. The vehicle of claim 17, wherein the bight segment includes:

a left bight element oriented generally longitudinally when the deck lid is in the closed position, the left bight element interconnecting the inboard end of the left bar element and the offset shaft; and a right bight element oriented generally longitudinally when the deck lid is in the closed position, the right bight element interconnecting the inboard end of the right bar element and the offset shaft.

19. A method for movably coupling a deck lid to a body of a vehicle such that the deck lid is movable between an open position and a closed position, the method comprising the steps of:

associating a ratchet track including detents with the deck lid;

affixing a torsion bar to the body; and engaging the torsion bar with the detents of the ratchet track to urge the deck lid toward the open position.

20. The method of claim 19, further comprising the steps of:

providing a roller on the torsion bar for serially engaging the detents as the deck lid is moved between the open and closed positions.

* * * * *